(12) United States Patent
Naumann

(10) Patent No.: US 6,244,113 B1
(45) Date of Patent: Jun. 12, 2001

(54) METHOD AND APPARATUS FOR MEASURING MICROGRAVITY ACCELERATION

(75) Inventor: Robert J. Naumann, Huntsville, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 09/431,568

(22) Filed: Oct. 29, 1999

(51) Int. Cl.$^7$ .................................................. G01P 3/26
(52) U.S. Cl. .................................................. 73/521; 73/523
(58) Field of Search ....................... 73/488, 521, 522, 73/523

(56) References Cited

PUBLICATIONS

Naumann, "AIAA 99–1028 An Analytical Model for Transport from Quasi–Steady and Periodic Accelerations on Spacecraft," 37$^{th}$ AIAA Aerospace Sciences Meeting and Exhibit, Jan. 11–14, 1999, pp. 1–8, Am. Inst. Aeronautics and Astronautis, Inc., Reston, VA.

Fox, et al., "AAA 98–0459 The International Space Stations Microgravity Acceleration Measurement System", 36$^{th}$ AIAA Aerospace Sciences Meeting and Exhibit, Jan. 12–15, 1998, pp. 1–10, Am. Inst. Aeronautics and Astronautics, Inc., Reston, VA.

Delombard, et al., "Comparison Tools for Assessing the Microgravity Environment of Space Missions, Carriers, and Conditions", *Visual Information Processing* VII, Apr. 13–14, 1998, pp. 394–402, SPIE, 1998, vol. 3387.

Monti, et al., "Microgravity Experiment Acceleration Tolerability on Space Orbiting Laboratories", *J. Spacecraft and Rockets*, Sep.–Oct. 1996, pp. 707–716, vol. 33, No. 5, Am. Inst. Aeronautics and Astronautics, Inc., Reston, VA.

(List continued on next page.)

Primary Examiner—Richard A. Moller
(74) Attorney, Agent, or Firm—Alston & Bird LLP

(57) ABSTRACT

The invention provides an apparatus for measuring microgravity acceleration that includes an elongate flow chamber having a first end and a second end and a liquid contained therein. Each end of the chamber is engaged by a plug member that is positioned to block the flow of the liquid through the ends of the container. Each plug member is maintained at a different known temperature such that a temperature gradient is created across the flow chamber. Temperature sensors are immersed in the liquid, the sensors being spaced apart along a line intersecting the axis of the flow chamber and normal thereto. Quasi-steady components of acceleration can be calculated based on the difference in the temperatures measured by the temperature sensors.

43 Claims, 6 Drawing Sheets

OTHER PUBLICATIONS

Meseguer, et al., "On the Use of Liquid Bridges as Accelerometers", *J. Microgravity Sci. Technol.*, 1996, pp. 62–69, vol. IX/2, Hanser Publishers, Munich, Germany.

Alexander, et al., "Glovebox Experiment #1: Final Report Passive Accelerometer System: Measurements on STS–50 (USML–1)", Center of Microgravity and Materials Research, The University of Huntsville Alabama, Huntsville, Alabama.

Nati, et al. "ASTRE– A Highly Performant Accelerometer for the Low Frequency Range of the Microgravity Environment", *J. Aerospace*, 1995, pp. 876–884, Section 1–vol. 103, Society for Automotive Engineers, Warrendale, PA.

Rogers, et al., "Detailed Analysis of Honeywell In–space Accelerometer Data—STS–32", *J. Microgravity Sci. Technol.*, 1993, pp. 28–33, vol. VI/1, Hanser Publishers, Munich, Germany.

Silvestrin, et al. "Ultra–Sensitive Spaceborne Accelerometer", *Preparing for the Future*, 1994, pp. 2–3, vol. 4, No. 2., ESA Publications Division, ESTEC, Noordwijk, The Netherlands.

Kamotani, et al., "Thermal Convection in an Enclosure Due to Vibrations Aboard Spacecraft", *AIAA Journal*, Apr. 1981, pp. 511–516, vol. 19, No. 4, Am. Inst. Aeronautics and Astronautics, Inc., N.Y., N.Y.

Bejan, et al., "Fully Developed Natural Counterflow In A Long Horizontal Pipe With Different End Temperatures", *Int. Heat Mass Transfer*, 1978, pp. 701–708, vol. 21.

Cormack, et al., "Natural Convection in a Shallow Cavity with Differentially Heated End Walls. Part I Asymptotic Theory", *J. Fluid Mech.*, Aug. 28, 1974, pp. 209–229, vol. 65, Part. 2, Cambridge University Press, New York, N.Y.

Cormack, et al. "Natural Convection in a Shallow Cavity with Differentially Heated End Walls. Part 2 Numerical Solutions", *J. Fluid Mech.*, Aug. 28, 1974, pp. 231–246, vol. 65, Part 2, Cambridge University Press, New York, N.Y.

Imberger, "Natural Convection in a Shallow Cavity with Differentially Heated End Walls. Part 3. Experimental Results" *J. Fluid Mech.*, Aug. 28, 1974, pp. 247–260, vol. 65, Part 2, Cambridge University Press, New York, N.Y.

Gill, "The Boundary–layer Regime for Convection in a Rectangular Cavity", *J. Fluid Mechanics*, Nov. 1966, pp. 515–536, vol. 26, Part 3, Cambridge University Press, New York, N.Y.

Naumann, et al. "High Precision Flow Cell Accelerometer for Measuring Quasi–Steady Microgravity Accelerations", Presented to the Microgravity Measurements Group, Jun. 15, 1999, Cocoa Beach, Fla. pp. 1–14.

Fox, et al. "Orbital Acceleration Research Experiment" Aerospace Industries Division & Test Measurement Division of ISA, May 7–11, 1995, pp. 649–658, Training and Publications Services, Research Triangle Park, NC.

METHOD AND APPARATUS FOR MEASURING MICROGRAVITY ACCELERATION

FIELD OF THE INVENTION

The invention relates to methods and apparatus for measuring acceleration, and more particularly relates to measurement of microgravity acceleration.

BACKGROUND OF THE INVENTION

Microgravity accelerations experienced onboard a space vehicle during flight are vector quantities, which comprise a magnitude and a direction, resulting from numerous forces acting on the vehicle. These accelerations have many sources, including residual gravity, drag, orbiter rotation, vibration from equipment and crew activity. The equivalent acceleration vector at any location in the orbiter is a combination of many different sources and, thus, a complex vector quantity changing over time.

Many experiments conducted in microgravity conditions are extremely sensitive to slight changes in microgravity acceleration. For example, experiments involving gravity-dependent fluid phenomena, such as buoyancy or sedimentation, and experiments involving crystal growth, can be greatly affected by microgravity accelerations. Even acceleration as low as 1 micro-g continuously acting in the same direction could affect certain classes of experiments. As a result, measurement of microgravity accelerations is often necessary to successfully conduct and evaluate such experiments.

However, measurement of the residual quasi-steady g-vector, which is generally the vector sum of aerodynamic drag and gravity gradient accelerations, has been a difficult task. In fact, NASA did not successfully measure quasi-steady acceleration until STS-40. The difficulty is caused, in part, by various mechanical and crew operations that excite the normal vibrational modes of the spacecraft and produce a wide spectrum of periodic accelerations (g-jitter) with amplitudes on the order of milli-g's that ride on top of the micro-g quasi-steady accelerations. Since the g-jitter arises from internal forces and, therefore, must time-average to zero, it should be possible to time-average out the oscillating component of acceleration and recover the quasi-steady component. However, a simple calculation will show that, if the oscillating component has amplitude A and period $\delta t$, the uncertainty in the time average taken over time P will be $\pm A \delta t /2\pi$ P. Thus, if one expects to extract a quasi-steady component, when there is an oscillating component that is 3 orders of magnitude larger, the integration time will have to be ~1000 times longer than the period of the oscillating component in order to obtain any reasonable accuracy. In other words, the data collection that is required to accurately separate the oscillating component from the quasi-steady component is unreasonably burdensome.

Instrument bias is another problem that must be overcome to effectively measure microgravity acceleration. Simple mass-spring accelerometers, which have been commonly used as the basis for many of the accelerometer systems flown in support of microgravity experiments, do not always return to the same null position when acceleration is removed, resulting in an instrument offset that affects the accuracy of the measurement. This instrument offset is sensitive to temperature as well as previous acceleration history. Therefore, no matter how carefully such an instrument is calibrated on the ground prior to flight, the instrument offset will be difference once in space, and can still change with time. This instrument bias is typically on the order of 100–200 micro-g. Attempts have been made to calibrate out this bias by inverting the accelerometer periodically under the assumption that the quasi-steady acceleration does not change during this interval. However, given the limited accuracy that one can obtain from taking a time average over a small interval of time and the fact that one is trying to accurately measure a fraction of a micro-g by subtracting two numbers that are two orders of magnitude larger, such a procedure is problematic at best.

The Orbital Acceleration Research Equipment (OARE) accelerometer, which is based on an electrostatic suspension system, has also been used as a microgravity accelerometer on space flights. The OARE system comprises a charged proof mass suspended electrostatically within a chamber and held in place by an electric field. Voltage is applied to plates surrounding the proof mass in order to maintain the proof mass in a central location within the chamber. The acceleration acting on the proof mass is related to the voltage necessary to keep the proof mass centered. While the OARE instrument is far more sensitive than the mechanical accelerometers, it is also considerably more complex and expensive. Further, it also requires in-flight calibration as the charge on the proof mass may vary. For this purpose, it is mounted on a turntable to either invert it or to apply a known amount of centripetal acceleration to the sensor. The OARE instrument is also sensitive to g-jitter, which must be filtered out electronically or through software.

There remains a need in the art for a microgravity acceleration measurement method and apparatus that requires little or no in-flight calibration and exhibits no loss of accuracy due to g-jitter or instrument bias.

SUMMARY OF THE INVENTION

The invention provides an accelerometer capable of measuring microgravity quasi-steady components of acceleration due to drag and gravity gradient effects. The accelerometer of the invention requires no in-flight calibration and suffers no performance or accuracy problems arising from g-jitter or instrument bias. The invention involves use of a differentially heated flow chamber to measure the temperature difference between two temperature sensors spaced apart along a line normal to the thermal axis of the chamber. The measured temperature difference can be used to calculate a quasi-steady component of acceleration.

One embodiment of the apparatus of the present invention comprises an elongate flow chamber having a first end and a second end. The chamber contains a liquid. A first plug member engages the first end and is operatively positioned to block flow of the liquid through the first end. A second plug member engages the second end and is operatively positioned to block flow of the liquid through the second end. Each plug member is capable of being maintained at a different known temperature, such that a temperature gradient exists across the length of the flow chamber. At least one pair of temperature sensors is immersed in the liquid. The temperature sensors are spaced apart along a line intersecting the axis of the flow chamber and normal thereto, one temperature sensor positioned on either side of the point of intersection. The apparatus can include two pairs of temperature sensors such that each pairs of temperature sensors is spaced along a line intersecting the thermal axis of the flow chamber and normal thereto. The lines defined by each pair of temperature sensors are also normal to each other. Preferably, the two pairs of temperature sensors are located in the same plane and at the approximate midpoint of the flow chamber.

The temperature sensors can be spaced at various positions between the wall of the flow chamber and the axis of the flow chamber. In one embodiment, the temperature sensors are positioned adjacent to the inner surface of the wall of the flow chamber. In another embodiment, the temperature sensors are positioned at the approximate midpoint between the axis of the flow chamber and the wall.

In a preferred embodiment, the apparatus includes an expansion chamber in fluid communication with the flow chamber. A piston is positioned for axial movement within the expansion chamber for accommodating thermal expansion of the liquid into the expansion chamber. A spring is operatively connected to the piston for biasing the piston towards the flow chamber. The expansion chamber can be located in either plug member.

The invention also provides a method of measuring microgravity acceleration wherein an elongate flow chamber defined by at least one wall and having a first end and a second is provided. The flow chamber contains a liquid therein and the first end and second end of the flow chamber are maintained at different temperatures. The temperature of the liquid is measured at two separate points along a line that intersects the axis of the flow chamber and is normal thereto. The measured temperatures are used to calculate a quasi-steady component of acceleration normal to the axis of the flow chamber. Both quasi-steady components of acceleration normal to the axis of the flow chamber can be calculated by measuring the temperature of the liquid at an additional two points along a second line that intersects the axis of the flow chamber and is normal to both the axis of the flow chamber and the line defined by the first two temperature measurement points.

Since the invention utilizes changes in temperature of a fluid, the response time of the invention provides a natural filter that removes the oscillating components of microgravity acceleration, such as g-jitter. Further, since the invention does not rely upon a proof mass or mechanical structures that are susceptible to instrument bias, in-flight calibration is unnecessary.

BRIEF DESCRIPTION OF THE DRAWINGS

Figure 1:
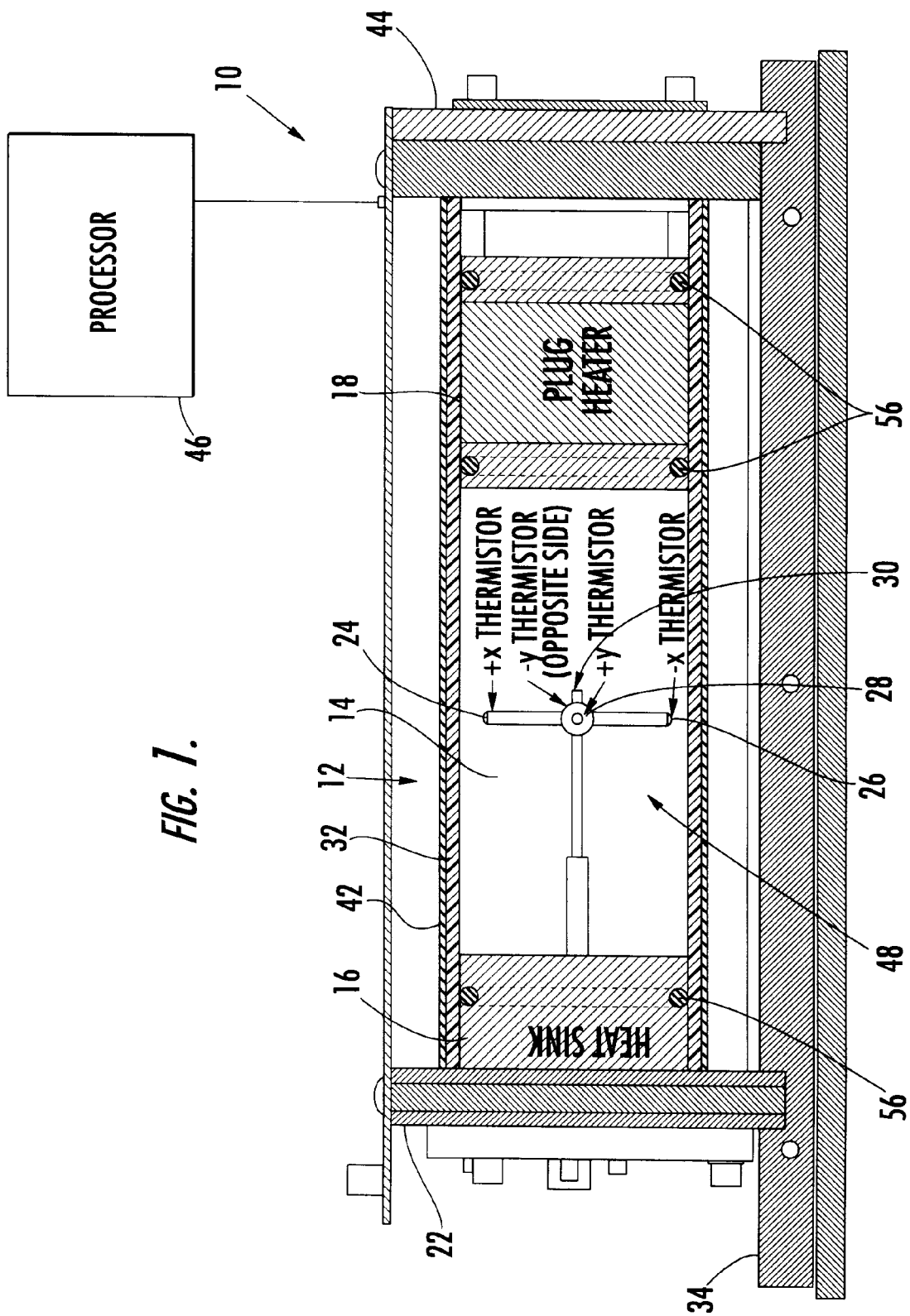
Figure 2:
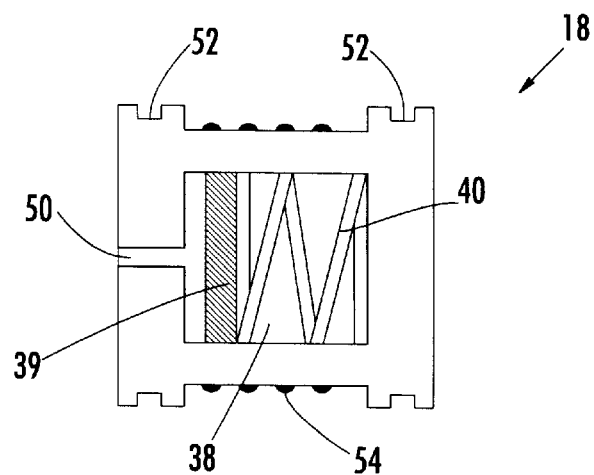
Figure 3:
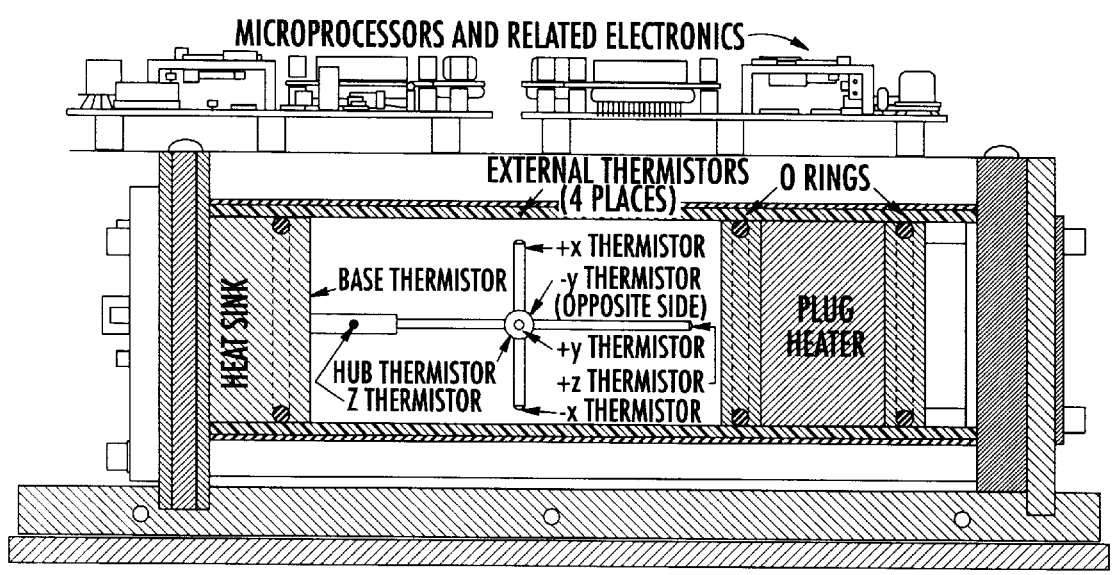
Figure 4:
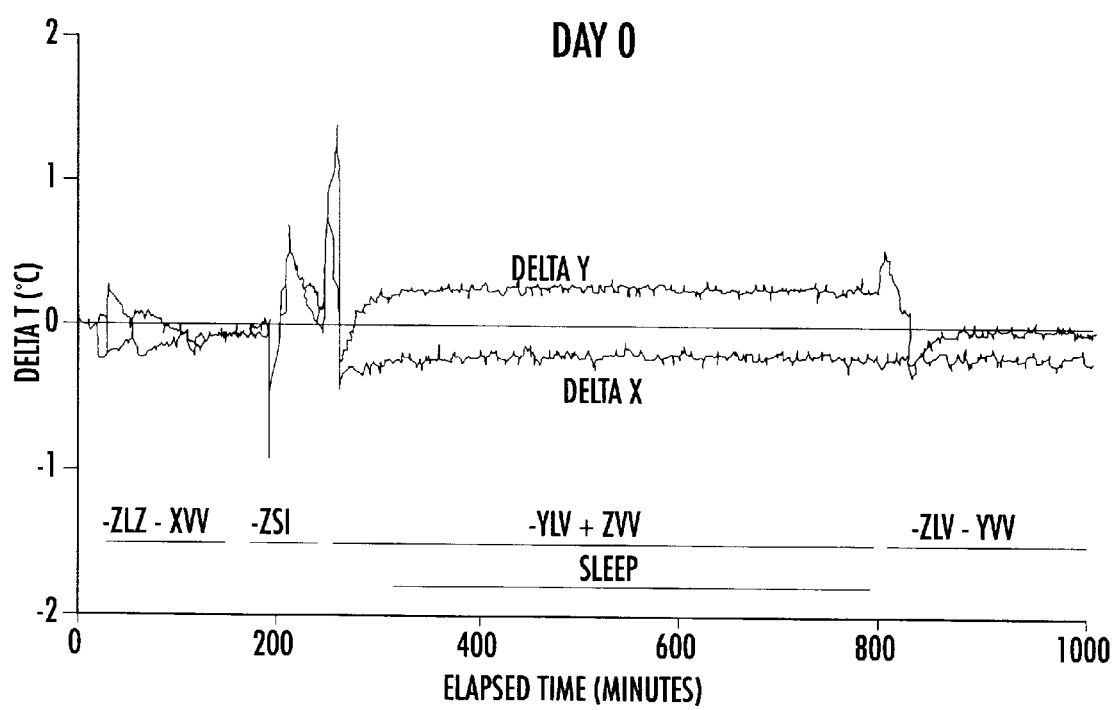
Figure 5:
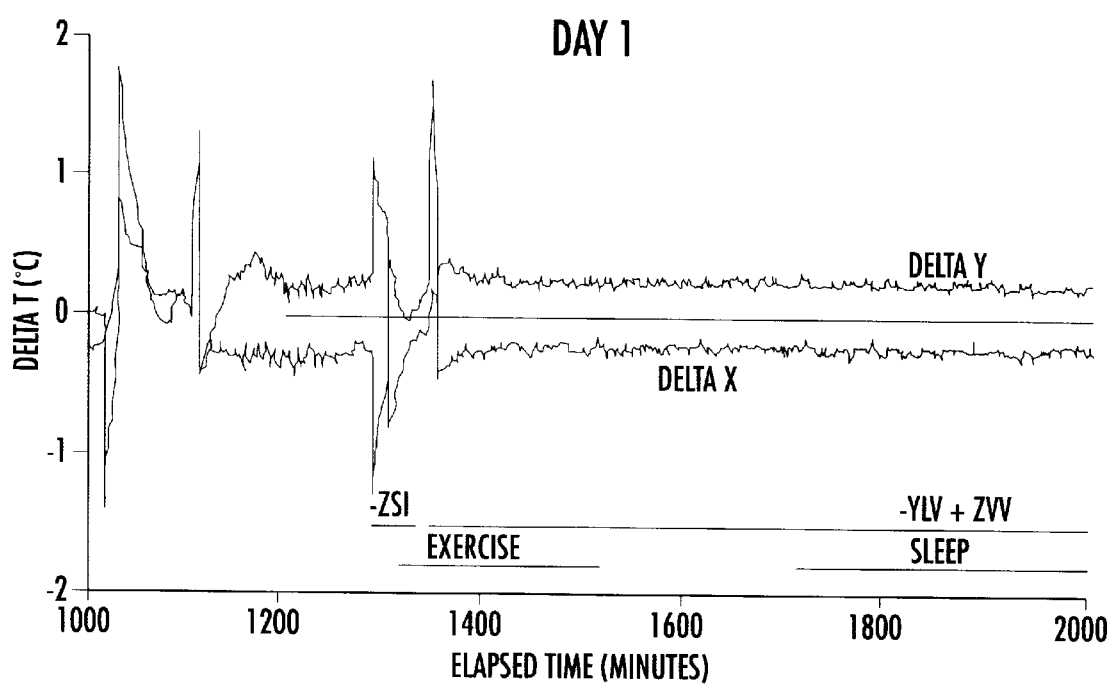
Figure 6:
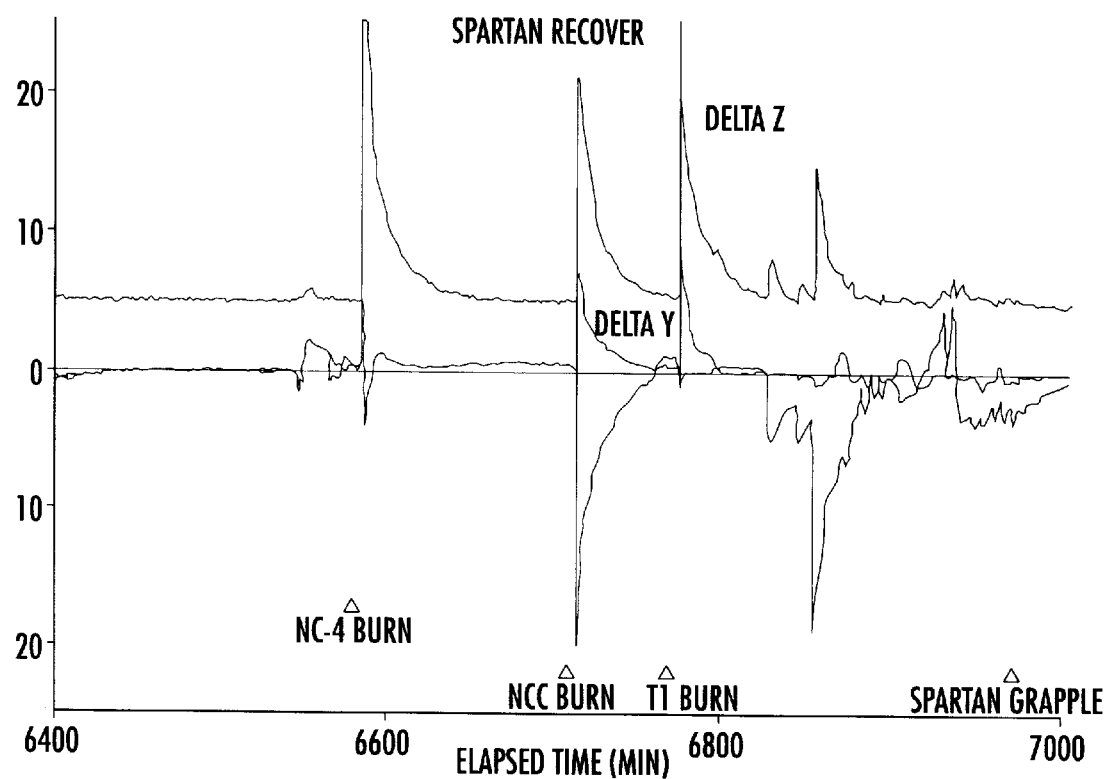
Figure 7:
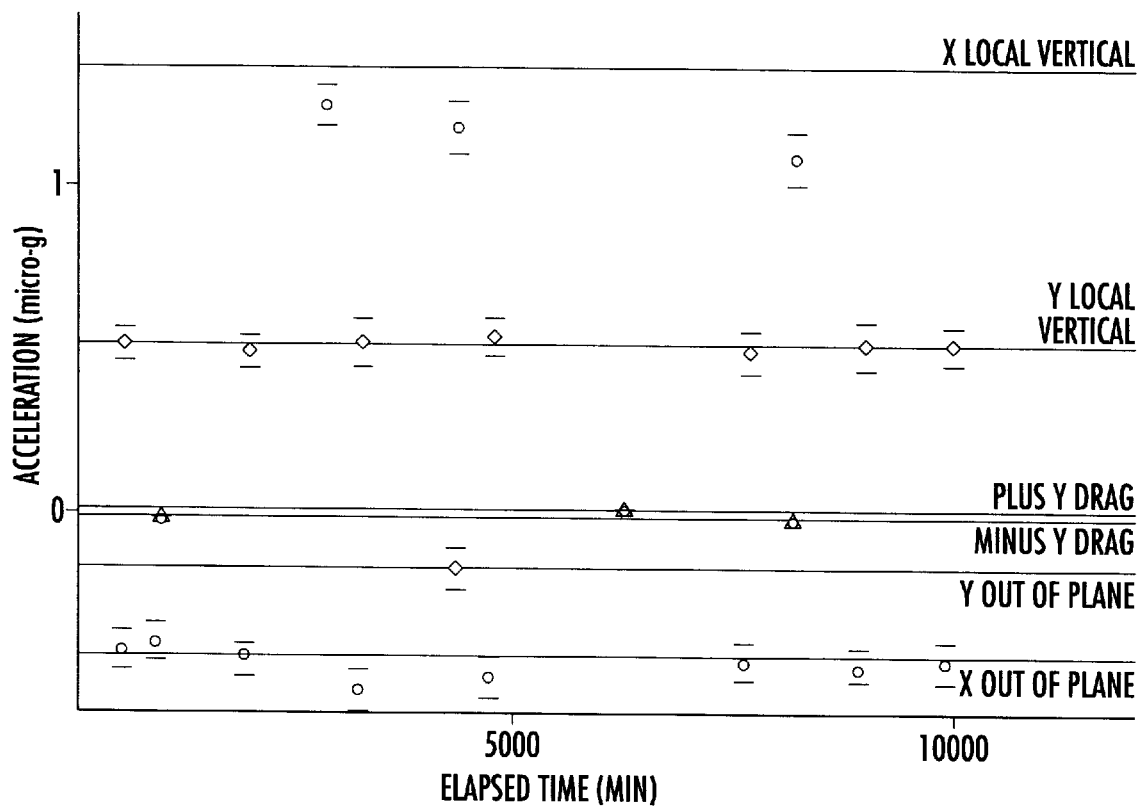

Having thus described the invention in general terms, reference will now be made to the accompanying drawings, which are not necessarily drawn to scale, and wherein:

FIG. 1 is a side view of an embodiment of the accelerometer of the invention;

FIG. 2 is a cross-sectional side view of a plug member of an embodiment of the invention;

FIG. 3 is a side view of a second embodiment of the accelerometer of the invention;

FIG. 4 is a graphical illustration of recorded temperature differences between the ±x and ±y thermistors;

FIG. 5 is a graphical illustration of a comparison of disturbances during an exercise period and a sleep period aboard an orbiting space vehicle;

FIG. 6 is a graphical illustration of disturbances from firing main thrusters during a Spartan satellite recovery; and FIG. 7 is a graphical illustration of acceleration levels inferred from temperature data compared with gravity gradient and drag.

DETAILED DESCRIPTION OF THE INVENTION

The invention now will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will filly convey the scope of the invention to those skilled in the art. Like numbers refer to like elements throughout.

The invention provides a method and apparatus for measuring acceleration, particularly microgravity acceleration. Microgravity acceleration is defined as an acceleration of less than the Earth's gravitation acceleration (1 g). For example, the invention can be configured to effectively measure microgravity acceleration in the range of about 10 nano-g to about 100 micro-g. The invention can be utilized in any environment where microgravity acceleration is experienced. For example, the invention could be utilized to measure microgravity acceleration experienced aboard orbiting spacecraft, aboard aircraft or rockets during parabolic flight, or during any activity involving free-fall.

One embodiment of the invention is illustrated in FIG. 1. The accelerometer 10 of the invention includes a flow chamber 12. The flow chamber 12 is defined by at least one wall 32. The flow chamber 12 is preferably cylindrical. However, other cross-sectional shapes can be used without departing from the invention. In a preferred embodiment, the aspect ratio, which is defined as the ratio of length to diameter, of the flow chamber 12 is at least about 2:1. More preferably, the aspect ratio of the flow chamber 12 is at least about 4:1.

The flow chamber 12 contains a liquid 14. Preferably, the liquid 14 substantially fills the flow chamber 12. The liquid 14 can be any liquid known in the art, such as water. Preferably, the liquid 14 has a high Prandtl number. The sensitivity of the apparatus 10 increases with increases in the Prandtl number of the liquid 14.

A plug member engages each end of the flow chamber 12. One end of the flow chamber 12 is engaged by a first plug member 16. A second plug member 18 engages the other end of the flow chamber 12. Preferably, both plug members, 16 and 18, are dimensioned to completely block an end of the flow chamber 12 to prevent the liquid 14 from escaping therefrom. In one embodiment, o-rings 56 are placed around the plug members, 16 and 18, to ensure a good seal between the plug members and the wall 32 of the flow chamber 12.

An important aspect of the invention is the temperature gradient across the length of the flow chamber 12. It is important to maintain each end of the flow chamber 12 at a different temperature. In a preferred embodiment, this is accomplished by controlling the temperature of the plug members, 16 and 18. Each plug member should be capable of being maintained at a known temperature. The sensitivity of the accelerometer apparatus 10 increases with increases in the difference between the temperature of the first plug member 16 and the second plug member 18. Preferably, the difference in temperature between the two plug members is at least about 20° C., more preferably at least about 30° C.

In one embodiment, the first plug member 16 is operatively connected to a heat sink 22, which maintains the first plug member 16 at about ambient temperature. Ambient temperature is defined as approximately 25±5° C. In order to maintain the first plug member 16 at ambient temperature, the heat sink 22 is inserted into a base plate 34 to provide a good thermal connection to the base plate. In turn, the base plate 34 should be mounted such that the base plate is capable of maintaining a temperature at or near ambient temperature and, consequently, maintaining the temperature of the heat sink 22 and adjacent first plug member 16 at ambient temperature.

The second plug member 18 preferably comprises a heater. Advantageously, the heater is capable of maintaining the second plug member 18 at a temperature of about 50 to about 100° C. In one embodiment, the heater is in the form of a copper plug, wherein current is fed to an electric coil 54 (shown in FIG. 2) wrapped around the plug member 18 to provide heating thereof. The second plug member 18 is preferably attached to an end support 44, which is attached to the base plate 34. In order to prevent heat loss from the second plug member 18, the end support 44 is constructed of an insulating material, such as a linen-filled phenolic resin.

Note that, while a preferred embodiment of the apparatus 10 maintains the first plug member 16 at ambient temperature, it is not necessary to hold either plug member at ambient temperature for purposes of the invention. In fact, both plug members could vary in temperature, as long as a temperature gradient exists across the length of the flow chamber 12.

In the embodiment illustrated in FIG. 1, a temperature sensor array 48 is immersed in the liquid 14. Although shown as mounted to plug member 16, the temperature array 48 may be affixed within the flow chamber 12 in any manner known in the art. The temperature sensor array 48 includes at least one pair of temperature sensors spaced apart along a line intersecting the thermal axis of the flow chamber 12 and normal thereto, one temperature sensor positioned on either side of the point of intersection. The thermal axis of the chamber 12 is the axis of the chamber extending between the differentially heated ends of the chamber. The temperature sensors can comprise any type of temperature sensor known in the art, such as thermistors.

For example, as shown in FIG. 1, two temperature sensors, 24 and 26, are spaced along a line or axis normal to the axis of the flow chamber 12. The temperature difference between the temperature reading of sensor 24 and the temperature reading of sensor 26 can be used to calculate the quasi-steady component of acceleration in the direction of the axis of the temperature sensors (labeled ±X).

If both components of acceleration normal to the axis of the flow chamber 12 are to be measured, a second set of temperature sensors, 28 and 30, can be added as shown. The second pair of temperature sensors, 28 and 30, are spaced apart along a line intersecting the axis of the flow chamber 12 and normal thereto, and also normal to the line defined by the first pair of temperature sensors, 24 and 26. The temperature difference between the temperature reading of sensor 28 and the temperature reading of sensor 30 can be used to calculate the quasi-steady component of acceleration in the direction of the axis of the temperature sensors (labeled ±Y).

Preferably, the two pairs of temperature sensors are located in the same plane and at the approximate midpoint of the flow chamber. However, the temperature sensors can be placed in different planes and can be spaced from the midpoint of the flow chamber without departing from the invention.

The preferred position of the temperature sensors in relation to the wall 32 of the chamber 12 depends on whether the flow chamber is assumed to be adiabatic or conductive. For example, the wall 32 of the flow chamber 12 can be constructed of a conductive material, such as a metal. If the wall 32 of the flow chamber 12 is conductive, it is preferable that the temperature sensors be placed at the approximate midpoint between the thermal axis of the flow chamber and the wall of the flow chamber. Alternatively, the wall 32 of the flow chamber 12 can be constructed of a poorly conductive material and well-insulated, such as by insulation layer 42 placed adjacent to the wall, as shown in FIG. 1. The insulation 42 comprises any suitable insulation known in the art, such as REFLECTIX™ insulation. In another embodiment, a vacuum jacket is placed around the wall 32 of the flow chamber 12 to provide insulation. If the wall 32 of the flow chamber 12 is a poor conductor and well insulated, and thus considered adiabatic, it preferable for the temperature sensors to be placed adjacent to the inner surface of the wall of the flow chamber. Alternatively, if the wall 32 is adiabatic, the temperature sensors can be imbedded in the wall. However, the temperature sensors can be placed at other positions between the wall 32 and the axis of the flow chamber 12 without departing from the invention.

Now referring to FIG. 2, to accommodate possible thermal expansion of the liquid 14 within the flow chamber 12, a preferred embodiment of the accelerometer 10 further includes an expansion chamber 38 located within the second plug member 18. As shown, the expansion chamber 38 contains a piston 39 attached to a spring 40. The spring 40 biases the piston towards the midpoint of the flow chamber 12. The expansion chamber 38 is in fluid communication with the flow chamber 12 through port 50. As thermal expansion of the liquid 14 occurs, the spring-loaded piston 39 will move axially to accommodate flow of the liquid into the expansion chamber 38. O-ring grooves 52 are provided to hold o-rings 56 (shown in FIG. 1) in place. Although shown as part of the second plug member 18, the expansion chamber 38 and piston 39 can be placed in either plug member without departing from the invention. Alternatively, at least one of the first plug member 16 and second plug member 18 can be mounted for axial movement within the flow chamber, such that thermal expansion of the liquid 14 can be accommodated without the use of a separate expansion chamber. For instance, one of the plug members, 16 or 18, could be attached to a spring, wherein the spring biases the plug member towards the midpoint of the flow chamber 12.

In a preferred embodiment, a processor 46 is operatively connected to the apparatus 10 for data collection and calculation of the components of acceleration. For example, the processor 46 can collect temperature data from the temperature sensors and monitor the temperatures of the two plug members, 16 and 18. Preferably, the processor 46 comprises computer hardware, software or a combination thereof.

Since the accelerometer 10 described above and illustrated in FIG. 1 can only measure components of acceleration normal to the axis of the flow chamber 12, two accelerometers positioned normal to one another would be necessary to give a full three-dimensional measure of the quasi-steady acceleration. However, for certain applications, two-dimensional capability is all that is required. For example, care must be taken to align the furnace axis with the residual gravity vector in a Bridgman-type crystal growth experiment if diffusion limited growth conditions are to be established; a feat NASA has yet to accomplish on the Shuttle. An apparatus 10 according to the invention positioned adjacent to, and aligned with, the furnace could give real-time indication of the accuracy of the furnace alignment.

The invention provides a number of advantages for measuring low-level quasi-steady acceleration. By using well-matched temperature sensors and precision resistors, there is virtually no instrument bias that must be calibrated out. Sensitivities better than 0.01 micro-g can be achieved using the invention. Further, the fluid response time of the invention acts as a natural filter that removes the oscillating component of microgravity acceleration, such as g-jitter. The fluid response time is proportional to the square of the radius of the chamber 12 and inversely proportional to the kinematic viscosity of the fluid 14. Thus, the size of the chamber 12 and the type of fluid 14 can be manipulated to adjust the fluid response time. The thermal field created by the apparatus of the invention is sensitive only to non-zero time average accelerations. As a result, the invention allows a very low sample rate to be used so that the data rate requirements are very modest and a real time display is possible without additional processing. The acceleration history of an entire mission can be easily displayed on a few pages. Also, the apparatus can be configured to mimic a particular experiment so that an investigator can see in real time what is happening to his experiment. For example, the wall 32 of the chamber 12 could be actively heated at predetermined points in order to generate a thermal field or profile that mimics the thermal field created by a particular experiment.

Although not bound by any particular theory, it is believed that the invention is governed by the first order perturbation solution for the flow and temperature distribution in the core region of a horizontal cylinder with differentially heated ends. It has been shown that, in the limit of large aspect ratios (ratio of length to diameter) and small Rayleigh numbers, the flow in the core region is parallel to the walls with the warmer fluid flowing from hot to cold in the upper half of the cylinder above a counter flow of the cooler fluid in the lower half of the cylinder. For the first order core flow and resulting temperature perturbation at $\eta$, the fractional distance along the radius, and $\eta$, the angular distance from the g-vector, the following Equations 1 and 2 are obtained.

$$u(\eta, \theta) = \frac{Gr\, v}{8L}(\eta^3 - \eta)\sin\theta \qquad \text{Equation 1}$$

$$T(z, \theta, \eta) - T_{cold} = \Delta T\left(\frac{z}{L}\right) + \frac{Ra\Delta T a^2}{192 L^2}\left(\eta^5 - 3\eta^3 + 2\frac{1+2C}{1+C}\eta\right)\sin\theta \qquad \text{Equation 2}$$

wherein the Grashof number $Gr = g\beta\Delta T\, a^3/v^2$, g is the acceleration of gravity, $\beta$ is the thermal expansivity, $\Delta T$ is the difference between the hot and cold end of the cylinder, L is the distance between the hot and cold sinks, a is the radius of the cylinder, and v is the kinematic viscosity. The Rayleigh number is $Ra = Gr\, Pr$, where the Prandtl number is the ratio of the kinematic viscosity to the thermal diffusivity, $\kappa$. The parameter C is the ratio of the product of fluid thermal conductivity and radius to the product of wall thermal conductivity and wall thickness.

For conductive walls (C<<1), the $\eta$-term peaks near $\eta$=0.5. Therefore, if temperature sensors were located on opposite sides at $\eta$=0.5, the difference in T read by the temperature sensors would be related to acceleration by the Equation 3.

$$\partial T = \frac{g\beta\Delta T^2 a^5 Pr}{96 v^2 L^2}(0.656)(\text{conductive walls}) \qquad \text{Equation 3}$$

For adiabatic walls, the $\eta$-term peaks near $\eta$=1. In this case, the temperature difference is related to acceleration by Equation 4 below.

$$\partial T = \frac{g\beta\Delta T^2 a^5 Pr}{48 v^2 L^2}(\text{adiabatic walls}) \qquad \text{Equation 4}$$

From this analysis, it can be seen that the sensitivity of the relationship between T and acceleration is directly proportional to the Pr, the square of the $\Delta T$, and the $5^{th}$ power of a. It is also seen that a system with adiabatic walls will have ~3 times the sensitivity of one with conductive walls. The above equations assume an aspect ratio (length to diameter) of at least about 4:1. For aspect ratios less than 4:1, the above equations must be multiplied by a geometric correction factor that is determined by numerical modeling. For an aspect ratio of 2:1, the correction factor is 0.80 and increases to 1.0 as the aspect ratio increases to 4:1.

EXAMPLE 1

An accelerometer according to the invention was flown on STS-95 as a joint US-Japanese venture called the Japanese-US Thermal Science Accelerometer Payload or JUSTSAP. A preliminary analysis of the results of the experiment is described below.

Structure of Experimental Accelerometer

The apparatus used in the experiment is illustrated in FIG. 3. The flow chamber was a 51 mm ID LEXAN cylinder with 3 mm walls. A heater assembly in the form of a copper plug was inserted into one end of the LEXAN cylinder and a heat sink, also in the form of a copper plug, was inserted into the other end leaving a 100 mm region filled with distilled water. Double O-rings on each plug prevented leakage. Thermal expansion was accommodated by a small chamber with a spring loaded piston located inside of the plug heater, which communicated with the water in the main flow chamber through two small ports in the plug heater face.

The flow chamber assembly was mounted close to the aluminum base plate to minimize bending moments on the end plates and to reduce the height of the center of mass. A thin aluminum sheet spanning the distance between the end plates further stiffened the structure and provided the mounting surface for the electronics. A flange on the heat sink mated with the aluminum end plate to provide a good thermal connection to the base plate, which in turn was heat-sinked to the Spacehab-provided mounting plate so that the fluid heat sink could be held passively at or near the ambient temperature of the Spacehab module (assumed to be 25±5° C). The heated end support was a linen-filled phenolic to minimize conduction of heat to the aluminum base plate. The tube was wrapped with Reflectix™ insulation (polyethylene bubble wrap sandwiched between aluminum foil) to reduce heat loss.

The base plate had a flange to accept a cover manufactured by Zero Corporation, which was drawn from a single sheet of 6061 aluminum. This cover was 267 mm long, 102 mm. wide and 127 mm high with 0.080" walls and made a tight fit over the base plate flange. It was held in place with stainless steel screws. Its purpose was to provide confinement should any breakage or leakage of the flow chamber occur, to prevent any contact with items above touch temperature, and to provide electromagnetic interference (EMI) shielding. The bottom rim of the cover was alodyned to assure good electrical contact with the base plate and the remainder of the cover was anodized to provide a surface with good emissivity. Four feet on the base plate extended past the cover to provide access to the stainless steel bolts that held the unit to the Spacehab-provided mounting plate. The total mass was 4.2 Kg.

Power Supply

Power was delivered to the accelerometer from the adjacent accelerometer power distribution box, which supplied both 28 and 12 VDC through a D-sub 9-pin power plug. The 28 VDC line was protected with a 2.5 Amp slow blow fuse and the 12 VDC line, required to operate the microprocessor, was protected with a 1 Amp fuse. A 0.1 $\mu f$ electrolytic capacitor and a 22 $\mu f$ monolithic capacitor provided EMI filtering on each line to prevent conductive noise. There was no conductive path to ground from either the 12 or the 28 VDC lines.

The plug heater drew approximately 1 Amp at 28 VDC and was operated at 65° C. under microprocessor control. The microprocessor interrogated the two control thermistors in the plug heater once every second. If the temperature was below the 65° C. set-point, the microprocessor turned on a FET switch that controlled the heater current for 1 second and placed a count in a data register. If either control thermistor read equal or greater temperature than the set point, the FET switch remained off until the next interrogation. Because of the large thermal mass of the plug heater, this simple bang-bang control algorithm kept the plug heater within 0.2° C. of the set point. The number of counts in the data register during one data cycle was indicative of the average power that had been sent to the heater in that data frame. Since the 28 VDC power provided by the Shuttle may fluctuate by ±4 VDC, the supply voltage was also monitored by the microprocessor and was stored in the data frame along with the thermistor data. Two 85° thermal fuses and a 75° C. thermal switch in the plug heater provided triple redundant protection against rupture of the flow chamber from over-pressure in the event of loss of thermal control.

When the system was first turned on, approximately 12–15 minutes was required for the copper plug heater to reach its operating temperature. During this time, the unit was drawing full power or approximately 30 Watts. After this initial heat-up, the average power draw dropped rapidly to approximately 5 Watts or less. However, under microgravity conditions, convective losses from the heater to the ambient atmosphere should become less and the average power draw should drop to 2–3 Watts.

Data Collection System

The data system consisted of two Onset Model 5F Tattletale microprocessors. One microprocessor controlled the heater and recorded 6 channels of thermistor data, the heater duty cycle, and the supply voltage. The other microprocessor recorded 8 channels of thermistor data at 1 sample/minute. The system was activated by turning on the adjacent accelerometer power distribution box, which supplied both 28 and 12 VDC power to the experiment. This applied voltage started the Tattletale microprocessors and latched the back-up batteries, which provide power to hold the stored data in the volatile memories after main power was removed. The back-up batteries consisted of two sets of four 9 V alkaline batteries in parallel. Each 9 V battery was diode protected and each group of cells was fused with a 1 Amp fuse. The individual batteries were vacuum tested according to JSC directive MA2-95-094 prior to installation to assure no leakage occurred.

RS-232 connections were provided on the front cover that allowed the system to be exercised, data to be retrieved, the batteries to be unlatched, and the computer to be reset before flight. The only crew interaction required during flight was to turn on the power at the beginning and off before re-entry.

The thermistor array was in the form of a turnstile or cross at the midplane to the flow chamber. YSI 55016 glass-encapsulated thermistors were mounted in thin glass tubes which were inserted into holes in a hub made from Corian™ and potted with Stycast. The configuration of the thermistor array is illustrated in FIG. 2. The Z-axis was taken along the thermal axis of the flow chamber, positive from cold to hot, the X-axis was normal to the base and positive upward, and the Y-axis was in the right-hand sense. Since the accelerometer was mounted on the rear bulkhead of the Spacehab module, our choice of axes was such that X is positive toward the nose, Y is positive toward the left wing, and Z is positive from floor to ceiling (it just so happens that these are the negative Shuttle axes). These YSI thermistors were extremely well matched, as were the presision bias resistors used in the ONSET data system. As a result, before the power was turned on, all thermistors were within 0.02° C. of each other, which was the least-count of the A/D converters in the data system.

In addition to the ±X and ±Y thermistors on the arms of the array, thermistors were also located in the hub, on the axis near the heater (+Z), near the heat sink (–Z), in the heat sink, and on the outer walls of the lexan tube opposite the ±X and ±Y array thermistors to give a more complete picture of the thermal field.

Results

The flow chamber was located at +3.59 meters from the center of mass in the X-direction (taken from tail to nose), –1.425 meters off the center line in the Y-direction (taken as positive along the right wing), and –0.27 meters in the Z-direction (taken as positive through the belly). The experimental unit was activated at MET 0/05:13. The recorded data in terms of the differences between the ±X array thermistors and between the ±Y array thermistors are displayed in the FIGS. 4 and 5. The sign of the temperature difference between the OX thermistors in FIG. 4 was reversed for clarity. Mission events are also displayed along the time axis. When these differences are quasi-steady, they can be thought of as a measure of the two perpendicular components of quasi-steady acceleration. The transients are the results of disturbances in the fluid as a result of thruster firings, attitude changes, or other propulsive events.

When the Shuttle was held in various Earth-fixed attitudes, the combination of atmospheric drag and gravity gradient accelerations produced a very slow convective roll inside the chamber which could be observed as temperature differences between plus and minus X and Y thermistors. For example, in the –YLV, +ZVV attitude (left wing down, belly toward the velocity vector), the difference between the ±X thermistors measured the flow produced by the gravity gradient acceleration from the out-of-plane X-displacement and the difference between the ±Y thermistors measured the flow produced by the gravity gradient acceleration from the Y-displacement along the local vertical. When the attitude was changed to –ZLV, –YVV, the ±Y temperature difference measured the flow produced by the drag acceleration. These results are shown in FIG. 4. It should be noted that the larger disturbances seen in FIG. 4 are the result of various attitude changes. Note the disturbances when the Shuttle was periodically brought to the –ZSI attitude (belly toward the sun) to warm the landing gear.

The increased periodic accelerations associated with crew exercise do not produce a detectable response on the accelerometer of the invention, as can be seen in FIG. 5. The disturbance around 1100 minutes in FIG. 5 was associated with the deployment of the PANSAT. The disturbance from the –ZSI (–Z toward the sun) was dying out when the exercise period began. The rms acceleration increased from 20 micro-g during the sleep period to over 200 micro-g during the exercise period. The experimental accelerometer, because of its low sampling rate, can only measure quasi-steady flows. However, an upper limit of about 0.036 microns/sec can be placed on the non-zero time average flow that might have resulted from these periodic accelerations. (Note: This upper limit would only apply to the circulating flows that fill the entire chamber. Second order symmetrical flows have nulls at the experimental measurement locations and would not be detected.)

A Spartan satellite was deployed on Day 3 and recovered early on Day 5. The main RCS thrusters were used during this time for station keeping with the Spartan. As can be seen from FIG. 6, this would have been no time to perform any sensitive low gravity experiment. The NC-4 burn was a 30 second burn from the −X RCS engine which imparted 7.1 ft/s. The lower trace is the Delta X data. The Delta Z in FIG. 6 refers to the difference between the heater temperature and the +Z thermistor, located 7 mm away. Under normal circumstances this difference is only ~5° C. However, the flows produced by these burns lowered this thermocouple temperature by more than 20° C., indicating that water from the cold end was circulated to the hot end or that an overturning flow had occurred.

At various times during the mission, the Shuttle was held at four different attitudes for extended periods. The gravity gradient accelerations at the accelerometer location for these different attitudes are displayed in Table 1 below. The drag acceleration was obtained from a plot of acceleration vs. altitude for different Shuttle orientations. At the 300 mile altitude for this mission, the drag is only 7 nano-g's. These accelerations were then used to compute the expected δT's for comparison with the measured δT's. The range of uncertainty in the measured δT's reflects the standard deviation about the mean averaged over the indicated interval. The array thermistors were located at η=0.6–0.7 and use of Equation 4 (adiabatic walls) seemed to give the closest fit to the observations, even though the calculated value for C is 1.97, which hardly makes the walls adiabatic. However, the walls were isolated from the plug heater and the heat sink by the double O-rings, so their temperature was driven more by the fluid rather than by conduction from heater to heat sink, which would tend to make them appear more adiabatic than conductive. Also, despite the REFLECTIX™ insulation, there was some lateral heat loss from the walls as evidenced by the fact that the wall thermistors consistently read lower temperatures than the adjacent array thermistors and that the average temperature in the middle of the flow chamber was always less than the average of the source and heat sink temperature.

TABLE 1

| Attitude | −YLV +ZVV | −ZLV −YVV | −XLV −YVV | −XLV +ZVV |
|---|---|---|---|---|
| Elapsed time (minutes) | 1842–2080 | 827–946 | 8012–8132 | 4217–4306 |
| $T_{cold}$ (° C.) | 28.62 | 27.59 | 29.68 | 31.84 |
| $g_x$ (micro-g) | −0.438 | −0.438 | 1.34 | 1.34 |
| $g_y$ (micro-g) | −0.521 | 0.0007 | 0.0007 | 0.174 |
| $g_z$ (micro-g) | −0.013 | 0.098 | −0.033 | −0.013 |
| $u_{xmax}$ (μm/sec) | 0.285 | 0.293 | 0.831 | 0.78 |
| $u_{ymax}$ (μm/sec) | 0.340 | 0.0047 | 0.0044 | 0.103 |
| Pred. $\delta T_x$(° C.) | 0.212 | 0.224 | −0.600 | −0.529 |
| Meas. $\delta T_x$(° C.) | 0.207 ± 0.026 | 0.199 ± 0.029 | −0.535 ± 0.033 | −0.471 ± 0.030 |
| Pred. $\delta T_y$(° C.) | 0.253 | −0.0036 | −0.0032 | −0.070 |
| Meas. $\delta T_y$(° C.) | 0.260 ± 0.023 | −0.007 ± 0.002 | −0.007 ± 0.004 | −0.070 ± 0.024 |

The data in Table 1 represent only a single visit to a particular attitude. During the mission, several of these attitudes were visited repeatedly. To check the consistency of the data, the calculated gravity gradient acceleration was plotted for various attitudes along the mission timeline in FIG. 7. Each time the Shuttle was brought to that attitude, the X and Y components of acceleration were inferred by inserting the measured δT's into Equation 4. The resulting points were then plotted as points. As before, the error bars reflect the precision of the measurements.

Except for the X-axis along the local vertical, the data seem very consistent and agree with the calculated accelerations to within experimental error. Even though the least count of the D/A was 0.02° C., by averaging over an extended period in −YVV, the drag acceleration of 7 nano-g was detected. There was one instance when the attitude was set to Bias-ZLV, +YVV during a sleep period and the same drag with opposite sign was detected.

The discrepancy between the calculated and measured acceleration for the X-local vertical is not clear. If the distance between the experimental unit and the Center of Mass were in error, it would be reflected in the X-out of plane measurements, which do agree with the calculated gravity gradient acceleration within experimental error. It is possible that there is a thrust along the X-axis from the flash evaporators.

The foregoing description and accompany figures illustrate particular embodiments of the invention. However, is to be understood that the invention is not to be limited to the specific embodiments disclosed and that modifications and other embodiments are intended to be included within the scope of the appended claims.

That which is claimed:

1. An apparatus for measuring microgravity acceleration, comprising:
    an elongate flow chamber having a first end and a second end;
    a liquid contained within said flow chamber;
    a first plug member engaging said first end and operatively positioned to block flow of said liquid through said first end, said first plug member capable of being maintained at a known first temperature;
    a second plug member engaging said second end and operatively positioned to block flow of said liquid through said second end, said second plug member capable of being maintained at a known second temperature, said second temperature being different from said first temperature;

a first temperature sensor immersed in said liquid; and a second temperature sensor immersed in said liquid, wherein said first temperature sensor and said second temperature sensor are spaced apart along a line intersecting the thermal axis of the flow chamber at a point of intersection and normal to the thermal axis, and wherein one temperature sensor is positioned on either side of the point of intersection of said line and said thermal axis.

2. An apparatus according to claim 1, further comprising:

a third temperature sensor immersed in said liquid; and a fourth temperature sensor immersed in said liquid, wherein said third temperature sensor and said fourth temperature sensor are spaced apart along a second line intersecting the thermal axis of the flow chamber at a point of intersection, said second line being normal to both the thermal axis of the flow chamber and the line defined by said first temperature sensor and said second temperature sensor, and wherein said third and said fourth temperature sensors are positioned on opposite sides of said point of intersection of said second line and said thermal axis.

3. An apparatus according to claim 2, wherein said line defined by said first and second temperature sensors and said second line defined by said third and fourth temperature sensors are located in the same plane.

4. An apparatus according to claim 3, wherein said plane is located at the approximate midpoint of said flow chamber.

5. An apparatus according to claim 1, wherein said flow chamber is defined by at least one wall and said first and second temperature sensors are positioned adjacent to the inner surface of said wall of said flow chamber.

6. An apparatus according to claim 1, wherein said flow chamber is defined by at least one wall and said first and second temperature sensors are positioned at the approximate midpoint between said axis of said flow chamber and said wall.

7. An apparatus according to claim 1, wherein said flow chamber is cylindrical.

8. An apparatus according to claim 1, wherein said first plug member is operatively connected to a heat sink such that said first temperature is ambient temperature.

9. An apparatus according to claim 1, wherein said second plug member comprises a heater.

10. An apparatus according to claim 9, wherein said heater maintains said second temperature at about 50 to about 100° C.

11. An apparatus according to claim 1, further comprising a layer of insulation adjacent to the outer surface of said flow chamber.

12. An apparatus according to claim 1, further comprising a vacuum jacket adjacent to the outer surface of said flow chamber.

13. An apparatus according to claim 1, wherein said flow chamber is defined by at least one wall, said wall comprising a conductive material.

14. An apparatus according to claim 1, wherein at least one of said first plug member and said second plug member comprises:

an expansion chamber in fluid communication with said flow chamber;

a piston positioned for axial movement within said expansion chamber for accommodating thermal expansion of said liquid into said expansion chamber; and a spring operatively connected to said piston for biasing said piston towards said flow chamber.

15. An apparatus according to claim 1, wherein at least one of said first plug member and said second plug member is mounted for axial movement within said flow chamber for accommodating thermal expansion of said liquid in said flow chamber.

16. An apparatus according to claim 15, wherein said at least one of said first plug member and said second plug member is operatively connected to a spring biasing said plug member towards the midpoint of said flow chamber.

17. An apparatus according to claim 1, wherein the aspect ratio of the flow chamber is at least about 2:1.

18. An apparatus according to claim 17, wherein the aspect ratio of the flow chamber is at least about 4:1.

19. An apparatus according to claim 1, wherein said liquid is water.

20. An apparatus according to claim 1, wherein the difference between said first temperature and said second temperature is at least about 20° C.

21. An apparatus according to claim 20, wherein the difference between said first temperature and said second temperature is at least about 30° C.

22. An apparatus according to claim 1, wherein said temperature sensors comprise thermistors.

23. An apparatus for measuring microgravity acceleration, comprising:

an elongate flow chamber defined by at least one wall and having a first end and a second end, said flow chamber having a aspect ratio of at least about 2:1;

a liquid contained within said flow chamber;

a first plug member engaging said first end and operatively positioned to block flow of said liquid through said first end, said first plug member comprising a heat sink capable of maintaining the temperature of the first plug member at about ambient temperature;

a second plug member engaging said second end and operatively positioned to block flow of said liquid through said second end, said second plug member comprising a heater capable of maintaining the temperature of the second plug member at about 50 to about 100° C.;

a first pair of temperature sensors immersed in said liquid, said first pair of temperature sensors spaced apart along a first line intersecting the thermal axis of the flow chamber at a point of intersection and normal to the thermal axis, wherein one temperature sensors of said first pair of temperature sensors is positioned on either side of the point of intersection of said first line and said thermal axis;

a second pair of temperature sensors immersed in said liquid, said second pair of temperature sensors spaced apart along a second line intersecting the thermal axis of the flow chamber at a point of intersection, said second line being normal to both the thermal axis of the flow chamber and the first line defined by said first pair of temperature sensors, wherein one temperature sensor of said second pair of temperature sensors is positioned on either side of the point of intersection of said second line and said thermal axis, and wherein said first pair and said second pair of temperature sensors are located in the same plane, said plane located at the approximate midpoint of the flow chamber.

24. An apparatus according to claim 23, wherein said first pair and said second pair of temperature sensors are positioned adjacent to the inner surface of said wall of said flow chamber.

25. An apparatus according to claim 23, wherein said first pair and said second pair of temperature sensors are positioned at the approximate midpoint between said axis of said flow chamber and said wall.

26. An apparatus according to claim 23, wherein said flow chamber is cylindrical.

27. An apparatus according to claim 23, wherein at least one of said first plug member and said second plug member comprises:
- an expansion chamber in fluid communication with said flow chamber;
- a piston positioned for axial movement within said expansion chamber for accommodating thermal expansion of said liquid into said expansion chamber; and
- a spring operatively connected to said piston for biasing said piston towards said flow chamber.

28. An apparatus according to claim 23, wherein at least one of said first plug member and said second plug member is mounted for axial movement within said flow chamber for accommodating thermal expansion of said liquid in said flow chamber.

29. An apparatus according to claim 28, wherein said at least one of said first plug member and said second plug member is operatively connected to a spring biasing said plug member towards the midpoint of said flow chamber.

30. An apparatus according to claim 23, further comprising a layer of insulation adjacent to the outer surface of said flow chamber.

31. An apparatus according to claim 23, further comprising a vacuum jacket adjacent to the outer surface of said flow chamber.

32. An apparatus according to claim 1, wherein said wall of said flow chamber comprises a conductive material.

33. A method of measuring microgravity acceleration, comprising:
- providing an elongate flow chamber defined by at least one wall and having a first end and a second end and containing a liquid therein;
- maintaining the first end and the second end of the flow chamber at different temperatures;
- measuring the temperature of the liquid at two separate points along a line that intersects the thermal axis of the flow chamber at a point of intersection and is normal to the thermal axis, one temperature measurement point being on either side of the point if intersection of the line and the thermal axis; and
- calculating a quasi-steady component of acceleration normal to the thermal axis of the flow chamber using the difference between the two measured temperatures.

34. A method according to claim 33, further comprising:
- measuring the temperature of the liquid at an additional two points along a second line that intersects the thermal axis of the flow and is normal to both the thermal axis of the flow chamber and the line defined by the first two temperature measurement points, one of the additional temperature measurement points being on either side of the point of intersection of the second line and the thermal axis; and
- calculating a second quasi-steady component of acceleration normal to both the thermal axis of the flow chamber and the first calculated quasi-steady component of acceleration using the difference between the two additional measured temperatures.

35. A method according to claim 33, wherein said measuring step comprises measuring the temperature of the liquid at two points adjacent to the inner surface of the wall of the flow chamber.

36. A method according to claim 33, wherein said measuring step comprises measuring the temperature of the liquid at two points located at the approximate midpoint between the thermal axis of the flow chamber and the wall of the flow chamber.

37. A method according to claim 33, wherein said maintaining step comprises:
- maintaining the temperature of the first end of the flow chamber at about ambient temperature; and
- maintaining the temperature of the second end of the flow chamber between about 50 to about 100° C.

38. A method according to claim 33, wherein said maintaining step comprises maintaining a temperature difference of at least about 20° C.

39. A method according to claim 33, wherein said measuring step comprises measuring the temperature of the liquid at two separate points along a line that intersects the thermal axis of the flow chamber at the approximate midpoint of the flow chamber.

40. A method of measuring microgravity acceleration, comprising:
- providing an elongate flow chamber defined by at least one wall and having a first end and a second end and containing a liquid therein;
- maintaining the first end of the flow chamber at about ambient temperature;
- maintaining the second end of the flow chamber at a temperature of about 50 to about 100° C.;
- measuring the temperature of the liquid at two separate points along a first line that intersects the thermal axis of the flow chamber at a point of intersection and is normal to the thermal axis, one temperature measurement point being on either side of the point of intersection of the first line and the thermal axis; and
- measuring the temperature of the liquid at two separate points along a second line that intersects the thermal axis of the flow chamber at a point of intersection and is normal to both the thermal axis of the flow chamber and the first line, one temperature measurement point being on either side of the point of intersection of the second line and the thermal axis;
- calculating a first quasi-steady component of acceleration normal to the thermal axis of the flow chamber using the difference between the two measured temperatures along the first line; and
- calculating a second quasi-steady component of acceleration normal to both the thermal axis of the flow chamber and the first calculated quasi-steady component of acceleration using the difference between the two measured temperatures along the second line,
- wherein the first line and the second line are located in the same plane and intersect the thermal axis of the flow chamber at the approximate midpoint of the flow chamber.

41. An apparatus for measuring microgravity acceleration, comprising:
- an elongate flow chamber defined by at least one wall and having a first end and a second end;
- a liquid contained within said flow chamber;
- a first plug member engaging said first end and operatively positioned to block flow of said liquid through said first end, said first plug member capable of being maintained at a known first temperature;
- a second plug member engaging said second end and operatively positioned to block flow of said liquid through said second end, said second plug member capable of being maintained at a known second temperature, said second temperature being different from said first temperature;

a first temperature sensor imbedded in said wall of said flow chamber; and a second temperature sensor imbedded in said wall of said flow chamber, wherein said first temperature sensor and said second temperature sensor are spaced apart along a line intersecting the thermal axis of the flow chamber at a point of intersection and normal to said thermal axis, and wherein one temperature sensor is positioned on either side of the point of intersection of said line and said thermal axis.

42. An apparatus according to claim 41, further comprising:

a third temperature sensor imbedded in said wall of said flow chamber; and a fourth temperature sensor imbedded in said wall of said flow chamber, wherein said third temperature sensor and said fourth temperature sensor are spaced apart along a second line intersecting the thermal axis of the flow chamber at a point of intersection, said second line being normal to both the thermal axis of the flow chamber and the line defined by said first temperature sensor and said second temperature sensor, and wherein said third and said fourth temperature sensors are positioned on opposite sides of said point of intersection of said second line and said thermal axis.

43. An apparatus according to claim 42, wherein said line defined by said first and second temperature sensors and said second line defined by said third and fourth temperature sensors are located in the same plane.

* * * * *

UNITED STATES PATENT AND TRADEMARK OFFICE
CERTIFICATE OF CORRECTION

PATENT NO. : 6,244,113 B1
DATED : June 12, 2001
INVENTOR(S) : Naumann

Page 1 of 1

It is certified that error appears in the above-identified patent and that said Letters Patent is hereby corrected as shown below:

<u>Title page,</u>
Item [56], References Cited, PUBLICATIONS,
Line 5, "Astronautis" should read -- Astronautics --;
Line 6, "Stations" should read -- Station --.

<u>Column 12,</u>
Table 1, in the 3rd and 4th columns, line 5 under the sub-headings, "0.0007" should read -- 0.007 --.

<u>Column 14,</u>
Line 47, "sensors" should read -- sensor --.

<u>Column 15,</u>
Line 45, "if" should read -- of --.

Signed and Sealed this

Fifteenth Day of January, 2002

*Attest:*

*Attesting Officer*

JAMES E. ROGAN
*Director of the United States Patent and Trademark Office*